United States Patent
Qi (10) Patent No.: US 12,284,210 B2
(45) Date of Patent: Apr. 22, 2025

(54) JOINT TIME-FREQUENCY MEASUREMENT IN OPTICAL COMMUNICATION

(71) Applicant: Cisco Technology, Inc., San Jose, CA (US)

(72) Inventor: Bing Qi, Knoxville, TN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

(21) Appl. No.: 18/181,238

(22) Filed: Mar. 9, 2023

(65) Prior Publication Data
US 2024/0305665 A1    Sep. 12, 2024

(51) Int. Cl.
*H04L 9/40* (2022.01)
*H04B 10/075* (2013.01)

(52) U.S. Cl.
CPC ....... *H04L 63/1475* (2013.01); *H04B 10/075* (2013.01)

(58) Field of Classification Search
None
See application file for complete search history.

(56) References Cited

U.S. PATENT DOCUMENTS

| | | | | |
|---|---|---|---|---|
| 2002/0034360 A1* | 3/2002 | Ishii | ................... | G02B 6/29394 385/24 |
| 2004/0213578 A1* | 10/2004 | Takahara | ........... | H04B 10/2513 398/147 |
| 2009/0074192 A1* | 3/2009 | Beal | ....................... | H04L 9/0858 380/278 |
| 2009/0238578 A1* | 9/2009 | Taylor | ................ | H04B 10/6972 398/147 |
| 2012/0263456 A1* | 10/2012 | Tanaka | ............... | H04B 10/5055 398/25 |
| 2014/0321649 A1 | 10/2014 | Englund et al. | | |
| 2016/0234017 A1 | 8/2016 | Englund et al. | | |
| 2020/0274703 A1 | 8/2020 | Lukens et al. | | |

FOREIGN PATENT DOCUMENTS

CN    114785412 A    7/2022

OTHER PUBLICATIONS

Qi, "Single photon continuous variable quantum key distribution based on energy-time uncertainty relation," retrieved from https://arxiv.org/abs/quant-ph/0602158, Feb. 2006, 4 pages.

Qi, "Quantum key distribution based on frequency-time coding: security and feasibility," retrieved from https://arxiv.org/abs/1101.5995, Jun. 2011, 19 pages.

(Continued)

*Primary Examiner* — Darren E Wolf
(74) *Attorney, Agent, or Firm* — Edell, Shapiro & Finnan, LLC (57) ABSTRACT

An endpoint receives a photon signal jointly encoded in time and frequency as a time-frequency state, and separates the photon signal with a dispersive element to generate frequency components. The endpoint delays each corresponding frequency component by a corresponding time delay to separate out the frequency components in time before the endpoint recombines the frequency components to generate a frequency-separated signal. The endpoint measures the frequency-separated signal to determine the time-frequency state of the photon signal.

20 Claims, 7 Drawing Sheets

(56) References Cited

OTHER PUBLICATIONS

Nunn, et al., "Large-Alphabet Time-Frequency Entangled Quantum Key Distribution by means of Time-to-Frequency Conversion," retrieved from https://arxiv.org/abs/1305.0960, May 2013, 14 pages.

Niu, et al., "Finite-key analysis for time-energy high-dimensional quantum key distribution," CHORUS accepted manuscript, published in Phys. Rev. A 94, 052323, Nov. 2016, 25 pages.

Bourassa, et al., "Entropic uncertainty relations and the measurement range problem, with consequences for high-dimensional quantum key distribution," retrieved from https://arxiv.org/abs/1810.05654, Dec. 2018, 18 pages.

Walk, et al., "Composably secure time-frequency quantum key distribution," retrieved from https://arxiv.org/abs/1609.09436, Sep. 2016, 13 pages.

\* cited by examiner

FIG.6

JOINT TIME-FREQUENCY MEASUREMENT IN OPTICAL COMMUNICATION

TECHNICAL FIELD

The present disclosure relates to optical network communication, specifically for quantum communication and Quantum Key Distribution (QKD).

BACKGROUND

Quantum Key Distribution (QKD) is a relatively mature quantum technology that provides a cryptographic key distribution protocol with proven security against quantum adversaries. Typical QKD implementations are purpose-built quantum communication system that are built in parallel with classical communication systems. Classical optical communication systems typically employ high intensity laser pulses, and QKD system operate at the single-photon level. In an entanglement-based QKD system, secure key bits are derived from measurement of entangled photons, typically measured along a randomly selected basis, such as time or frequency.

Time and frequency encoding schemes have each been employed in both classical and quantum communications. Unlike other encoding schemes, such as polarization encoding, both time encoding and frequency encoding are robust against environmental disturbance, which provides an advantage with conducting quantum communication over long optical fibers. Furthermore, time encoding and frequency encoding allows for more than one bit of information to be encoded on a single photon, increasing the efficiency of the quantum communication.

DETAILED DESCRIPTION

Overview

A method is provided for encoding and decoding a single photon with time information and frequency information. The method includes receiving a photon signal jointly encoded in time and frequency as a time-frequency state, and separating the photon signal with a dispersive element to generate a plurality of frequency components. The method also includes delaying each corresponding frequency component of the plurality of frequency components by a corresponding time delay, and combining the plurality of frequency components to generate a frequency-separated signal. The method further includes measuring the frequency-separated signal to determine the time-frequency state of the photon signal.

Example Embodiments

In quantum communications, time and frequency encoding schemes have many advantages over other encoding schemes, such as high efficiency in terms of secure bits per photon and resilience against polarization noise and/or phase noise in the fiber channel. However, typical time/frequency encoding Quantum Key Distribution (QKD) protocols are based on a random-selection scheme in which only one parameter (e.g., time or frequency) is measured for each transmission. Due to a measurement range limit, an adversary may introduce a basis-dependent attack to influence which type of measurement is conducted and gain substantial information about the measurement result. In this manner an adversary could degrade the performance of existing QKD protocols, especially for protocols using entangled photon sources.

The techniques presented herein describe a joint time-frequency measurement scheme in which the detector resolves both the arrival time and the frequency of each detected photon, with precision bounded by the Uncertainty Principle. Since the detection probability is independent of the measurement basis, the techniques presented herein remove the security issue that could result from an adversary exploiting the measurement range limit. Furthermore, both the time measurement and the frequency measurement may be used for key generation, increasing efficiency. Since the measurement is basis-independent, the endpoints do not need to share information to compare basis selection and dropping measurements in which the basis selection does not match, as in typical QKD systems.

The general concept of performing simultaneous measurements in two conjugate bases was introduced in continuous variable QKD using double homodyne detection and its security is well established. Due to the Uncertainty Principle, the simultaneous measurements of conjugate variables are intrinsically noisy. However, any attacks by an adversary will introduce additional noise above the quantum limit, and may be detected by the endpoints. The techniques will be presented hereinafter with respect to QKD protocols, but the joint time-frequency detection scheme described herein may also be useful for other quantum communication and sensing protocols.

The joint time-frequency detection scheme results in a detector that either reports no detection (i.e., the photon was lost) or reports both the time and frequency of the detected photon. The basis-independent null measurement results completely remove the security loophole due to an attack exploiting the measurement range limit issue. Additionally, the Uncertainty Principle ensures a minimum measurement noise since $\Delta t^* \Delta f \approx 1$. Any attack from an adversary causes excess noise above the minimum measurement noise, and the excess noise may itself be measured leading to a quantified measurement of the amount of information that may have been leaked to the adversary.

Figure 1:
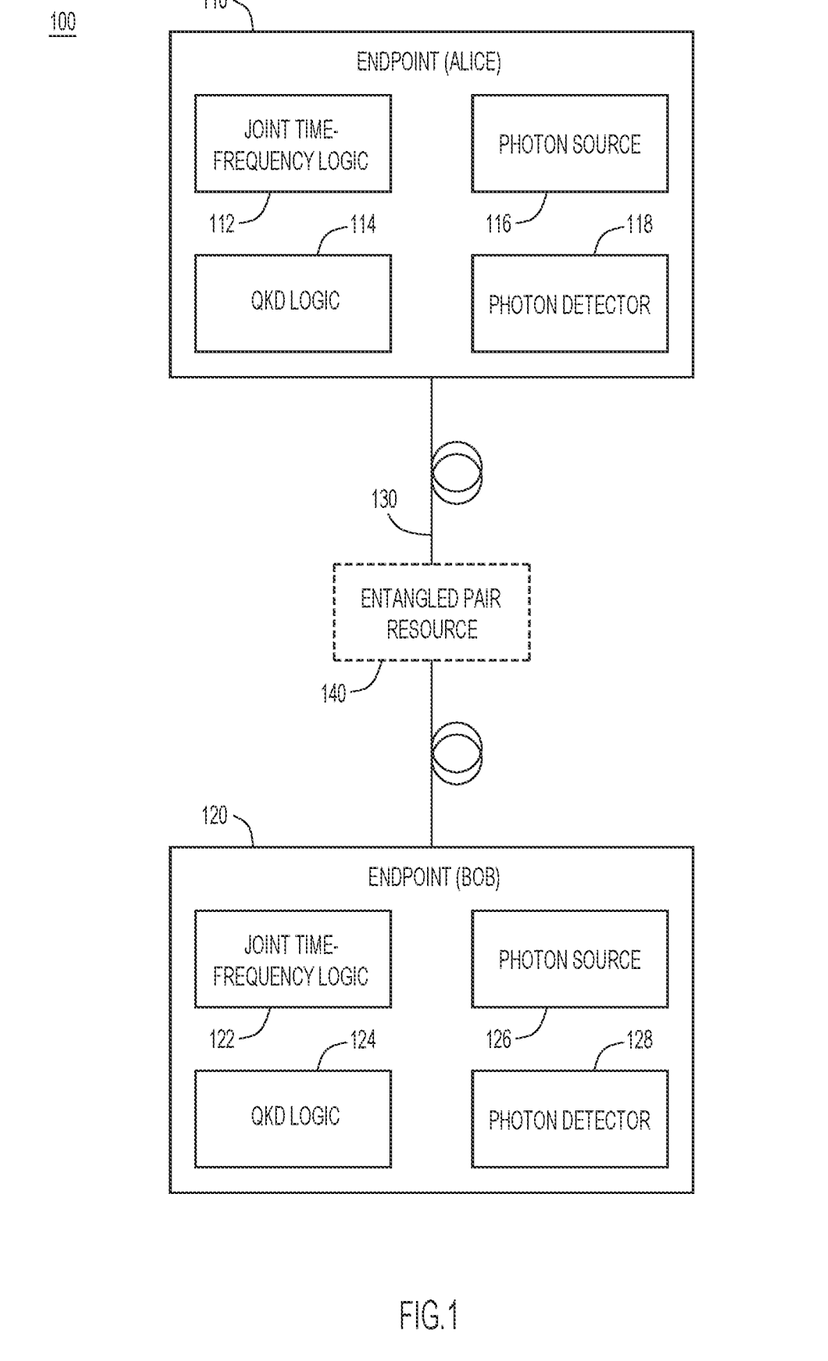
FIG. 1 is simplified block diagram of Quantum Key Distribution (QKD) between endpoints using joint time-frequency encoding, according to an example embodiment.

Referring now to FIG. 1, an optical communication system 100 between two endpoints is shown. The first endpoint 110 (e.g., Alice) includes joint time-frequency logic 112, QKD logic 114, a photon source 116, and a photon detector 118. The second endpoint 120 (e.g., Bob) includes joint time-frequency logic 122, QKD logic 124, a photon source 126 and a photon detector 128. The first endpoint 110 and the second endpoint 120 are connected by an optical link 130. Additionally, an entangled pair resource 140 may be located at some point along the optical link 130.

In one example, the first endpoint 110 and the second endpoint 120 may be computing devices (e.g., servers, personal computers, network devices, virtual machines, etc.) configured to communicate with each other. The joint time-frequency logic 112 enables the first endpoint 110 to encode and decode single photons in both time and frequency as described herein. Similarly, the joint time-frequency logic 122 enables the second endpoint 120 to encode and decode single photons in both time and frequency as described herein.

The QKD logic 114 and the QKD logic 124 enable the first endpoint 110 and the second endpoint 120, respectively, to generate secure key bits according to a QKD protocol. The QKD protocol may be a prepare and measure protocol or an entanglement-based protocol. Additionally, the QKD protocol may include information reconciliation to ensure that the secure key bits generated by Alice and Bob match. Privacy amplification may also be included in the QKD protocol to reduce the amount of information from the final secret key that is available to an eavesdropper (e.g., Eve) to an arbitrarily small level.

The photon source 116 and the photon source 126 enable the first endpoint 110 and the second endpoint 120, respectively, to generate a single photon that is encoded in time and frequency. In one example, the photon source 116 and the photon source 126 may include single photon emitters that encode the time information with a trigger signal and frequency shifters to encode the frequency information. Alternatively, the photon source 116 and the photon source 126 may include phase randomized attenuated laser sources, intensity modulators to encode time information and generate decoy states, and frequency shifters to encode the frequency information.

The photon detector 118 and the photon detector 128 enable the first endpoint 110 and the second endpoint 120, respectively, to detect and measure the time information and frequency information from a single photon. In one example, the photon detector 118 and the photon detector 128 may include dispersive components and one or more time-resolving single photon detectors.

In another example, the optical link 130 may be a direct fiber link between the first endpoint and the second endpoint 120. Alternatively, the optical link 130 may pass through one or more network elements (e.g., switches and/or routers) that form an optical network between the first endpoint 110 and the second endpoint 120.

In a further example, the optional entangled pair resource 140 enables the first endpoint 110 and the second endpoint 120 to each receive one photon from a pair of entangled photons that form a single quantum state. For instance, when a system within the entangled pair resource 140 is excited (e.g., with a pump photon), the system may emit two photons in a manner that the properties of the photons are related. Typically, the two photons will be generated at essentially the same time, correlating the time information of the two-photon state. Additionally, the energy (i.e., frequency) of the pump photon determines the total energy (i.e., the sum of the frequencies) of the two photons, (anti-) correlating the frequency information of the two emitted photons.

Figure 2:
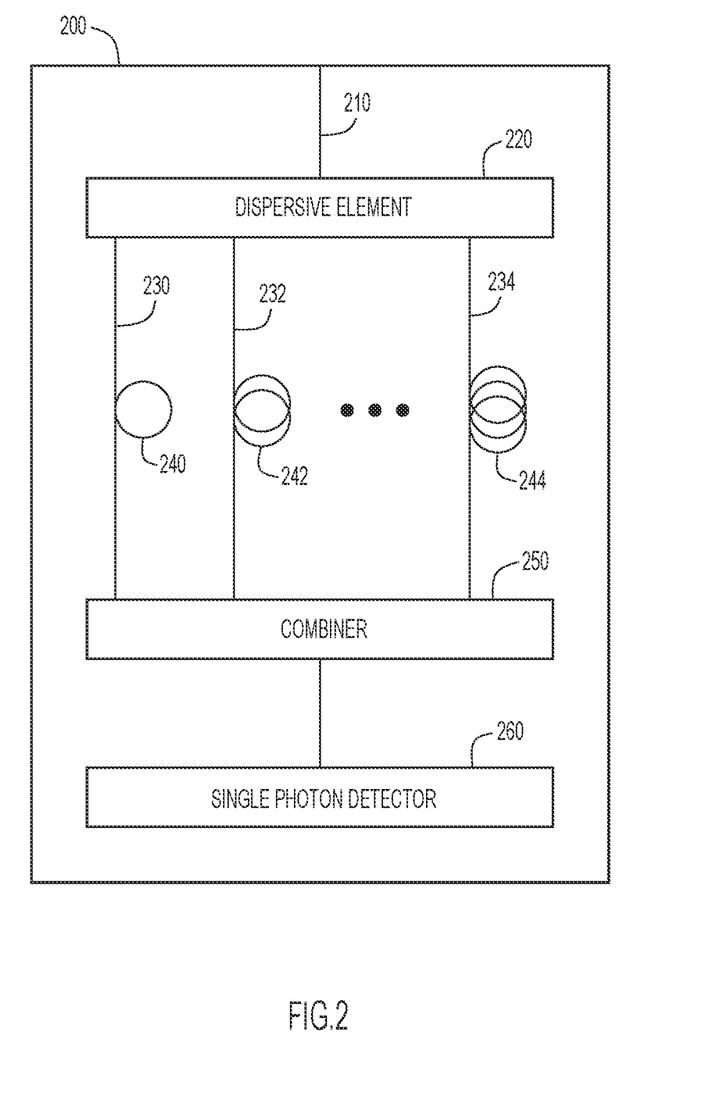
FIG. 2 is a simplified block diagram of joint time-frequency detector, according to an example embodiment.

Referring now to FIG. 2, an example of a photon detector 200 (e.g., photon detector 118 or 128) is shown. The photon detector 200 includes an input channel 210 that leads to a dispersive element 220. The dispersive element 220 is configured to separate frequency components of a photonic signal received from the input channel 210 and direct the frequency components into frequency channels 230, 232, and 234. The frequency channel 230 includes a delay loop 240 that controls the length of time the corresponding frequency component spends in the frequency channel 230. Similarly, the frequency channels 232 and 234 include delay loops 242 and 244, respectively, that control the lengths of time each corresponding frequency components spends in the respective frequency channel.

The frequency channels 230, 232, and 234 all end at a combiner 250 (e.g., an optical switch) that recombines the corresponding frequency components into a single signal that is measured by a single photon detector 260. The delay loops 240, 242, and 244 of the frequency channels 230, 232, and 234, respectively, delay the corresponding frequency component by different lengths of time, such that each frequency component is distinctly measured by the single photon detector 260.

In one example, the dispersive element 220 may be a reflective grating or transmissive grating. Alternatively, the dispersive element 220 may include a variable index of refraction to separate the frequency components into the corresponding frequency channels 230, 232, and 234. The dispersive element 220 broadens the temporal length of the photonic signal in each frequency channel 230, 232, and 234 by an amount inversely proportional to the spectral bandwidth of the respective frequency channel 230, 232, or 234.

In another example, the photon detector 200 may include more or fewer frequency channels than the three frequency channels 230, 232, and 234 shown in FIG. 2. In general, the photon detector 200 includes a plurality of frequency channels, with each frequency channel having a corresponding delay loop.

In a further example, the delay loop of each frequency channel may delay the corresponding frequency component of the input photon signal by an integer multiple of a base length $T_p$, such as the maximum length of time of the input photon signal. To take into account of the temporal broadening due to the dispersive element 220, the base length $T_p$ may include a guard time (e.g., $1/\Delta f$, where $\Delta f$ is the spectral bandwidth of the smallest frequency channel) in addition to the maximum length of time of the input photon signal. Each delay loop is configured to separate the corresponding frequency component sufficiently that they will not overlap when recombined by the combiner 250.

In other words, the delay loop 240 may delay the frequency component (e.g., f1) of the frequency channel 230 by an amount of time $T_{f1}=0*T_p$, the delay loop 242 may delay the frequency component (e.g., f2) of the frequency channel 232 by an amount $T_{f2}=1*T_p$, and the delay loop 244 may delay the frequency component (e.g., f3) of the frequency channel 234 by an amount $T_{f3}=2*T_p$. In general, the $N^{th}$ delay loop may delay the frequency component N by an amount $T_{fN}=(N-1)*T_p$.

Alternatively, each delay loop 240, 242, and 244 may be tailored to accommodate the temporal broadening of the specific frequency channel 230, 232, and 234, respectively. Since the temporal broadening of each frequency channel 230, 232, and 234 may be different, the corresponding delay loop 240, 242, and 242 may adjust the timing of the frequency components of a photonic signal to ensure that the frequency components do not overlap.

Figure 3:
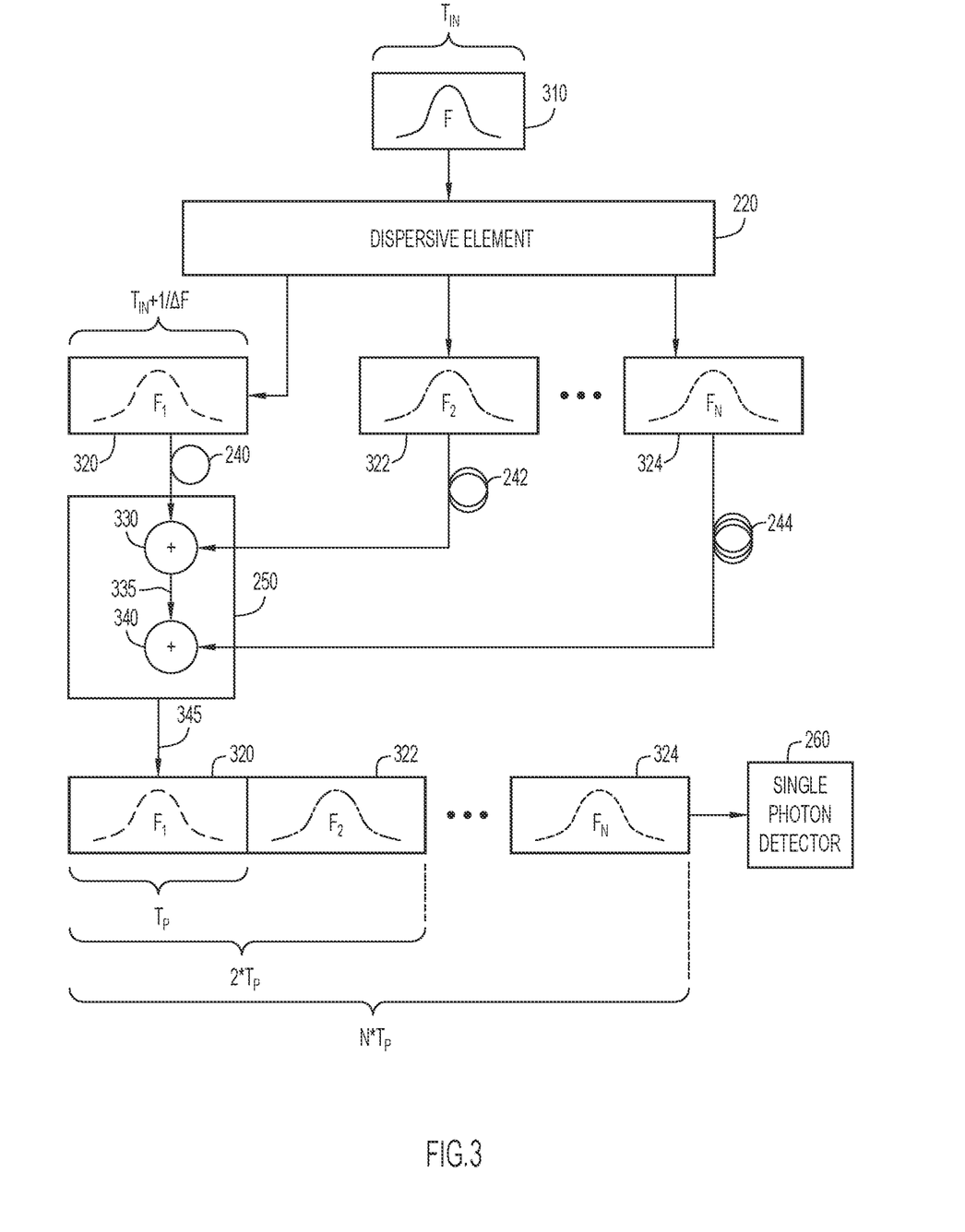
FIG. 3 illustrates a photon being separated into frequency components to facilitate joint time-frequency decoding, according to an example embodiment.

Referring now to FIG. 3, with continued reference to elements from FIG. 2, an example shows a photon detector (e.g., photon detector 200) processing a single photon to obtain time and frequency information. The input photon signal 310 arrives with a length of $T_{in}$ and a frequency range of F. The dispersive element 220 separates the input photon signal 310 into frequency components 320, 322, and 324. FIG. 3 explicitly shows three frequency components (e.g., frequency components 320, 322, and 324), but the dispersive element 220 may separate the input photon signal 310 into more or fewer frequency components. The frequency component 320 has a length of $T_P$ and includes a frequency range $F_1$. The frequency component 322 has a length of $T_P$ and includes a frequency range $F_2$. The frequency component 324 has a length of $T_P$ and includes a frequency range $F_N$.

The frequency component 320 travels through the delay loop 240 and reaches an adder 330 in the combiner 250. The delay loop 242 delays the frequency component 322 sufficiently that the delayed frequency component 322 reaches the adder 330 in the combiner 250 after the frequency component 320. The adder 330 produces a preliminary frequency separated signal 335 with frequency component 320 followed by frequency component 322. Similarly, the frequency component 324 travels through the delay loop 244 and the adder 340 concatenates the delayed frequency component 324 to the preliminary frequency separated signal 335 to generate a frequency separated signal 345. The frequency separated signal 345 is provided to the single photon detector 260, which determines the time-frequency encoding of the input photon signal 310.

The frequency separated signal 345 is the input photon signal 310 with different frequency components 320, 322, and 324 separated in time to allow one photon detector (e.g., single photon detector 260) to measure each frequency component at a different time. In one example, the temporal length of each frequency component is related to that of the input photon signal as $T_p = T_{in} + 1/\Delta f$, and is distinctly separated from each other frequency component. In other words, each frequency component has a base length that is long enough to contain the input photon signal 310 and the additional temporal broadening due to the dispersive element 220. In this example, the preliminary frequency separated signal 335 comprising the frequency component 320 and the frequency component 322 has a length of $2*T_P$, and the complete frequency separated signal 345 with N frequency components has a length of $N*T_P$.

In other words, the frequency separated signal 345 is measured in blocks of time equal to at least the length of the input photon signal 310 plus the temporal broadening. The frequency information of the input photon signal 310 is determined based on which block of time of the frequency separated signal 345 triggers the single photon detector 260. The time information of the input photon signal 310 is determined based on the specific time within the block of time that the single photon detector 260 is triggered.

In another example, the adder 330 and the adder 340 may be optical switches that function as adders for signals that are temporally distinct. In other words, the adder 330 and adder 340 may only be functionally equivalent to signal adders in the circumstances of normal operation of the combiner 250.

Figure 4A:
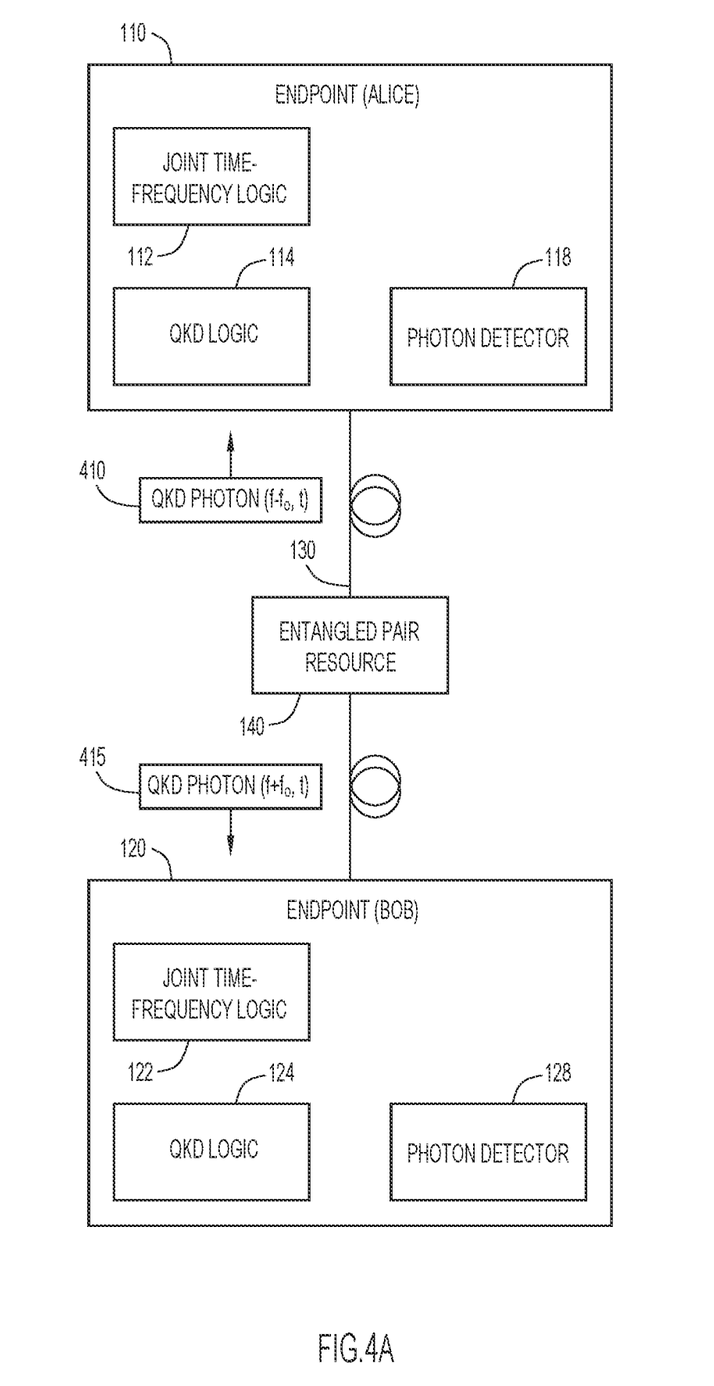
FIG. 4A is a simplified block diagram of a joint time-frequency encoded QKD system using photons from a centralized entangled pair resource, according to an example embodiment.

Referring now to FIG. 4A, an example of an entanglement-based QKD system based on the quantum optical communication system 100 of FIG. 1 is shown. In the entanglement-based QKD system the first endpoint 110 and the second endpoint 120 each receive one half of an entangled photon pair generated at the entangled pair resource 140. The first endpoint 110 receives a photon 410 and the second endpoint 120 receives a photon 415. The first endpoint 110 detects the time and frequency with the photon detector 118 and determines a set of one or more cryptographic bits using the QKD logic 114. Similarly, the second endpoint 120 detects the time and frequency of the photon 415 with the photon detector 128 and determines the same set of one or more cryptographic bits with the QKD logic 124.

In one example, the entangled pair resource 140 generates the photon 410 and the photon 415 through a process that converts the energy of a single pump photon into the two entangled photons 410 and 415. The time information in the photon 410 and the photon 415 are correlated, since the photons are created at the same time. The frequency information of the photon 410 and the photon 415 are anti-correlated, since the combined energy of the photon 410 and the photon 415 are constrained by the energy of the pump photon. In other words, if the entangled pair resource 140 uses a pump photon with a frequency of 2f, and the photon 410 has a frequency of $f-f_o$, then the photon 415 will have a frequency of $f+f_o$ based on the combined energy/frequency of the pump photon.

Both the correlated time information and the anti-correlated frequency of the photons 410 and 415 may be used by the endpoints 110 and 120 to generate the same set of bits for a secret key. The respective QKD logic in the first endpoint 110 and the second endpoint 120 may perform additional information reconciliation and/or privacy amplification steps to determine a secure key for additional communication between the first endpoint 110 and the second endpoint 120.

In another example, the first endpoint 110 and the second endpoint 120 may measure the noise captured in the measurement of the joint time-frequency state of the photons 410 and 415 to determine whether one or both of the photons 410 and 415 have been intercepted before arriving at the first endpoint 110 and the second endpoint 120, respectively. Based on the noise in the measurement of the time information and the frequency information, the first endpoint 110 and the second endpoint 120 may quantify the amount of information that may be leaked to an eavesdropper along the optical link 130. The measure of leaked information may be further used for privacy amplification.

Figure 4B:
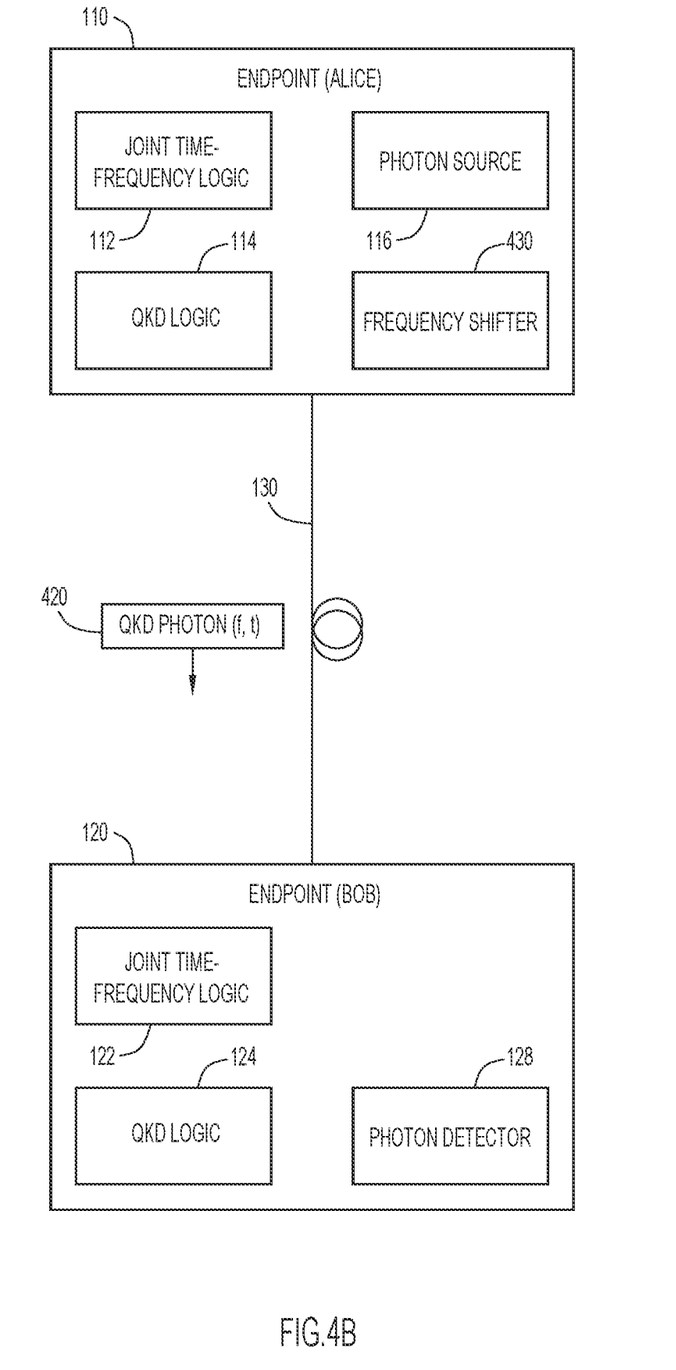
FIG. 4B is a simplified block diagram of a joint time-frequency encoded QKD system using photons that are prepared at the source and measured at the destination, according to an example embodiment.

Referring now to FIG. 4B, an example of prepare and measure QKD system based on the quantum optical communication system 100 of FIG. 1 is shown. In the prepare and measure QKD system the first endpoint 110 encodes a photon 420 with time and frequency information that the second endpoint 120 measures, and both endpoints 110 and 120 use the communicated time and frequency information to generate secret key bits. The first endpoint 110 encodes the time information using the photon source 116 by generating a single photon at a specific time. The first endpoint 110 encodes the frequency information with a frequency shifter 430 that shifts the frequency of the photon generated by the photon source 116.

In one example, the time information is encoded by a trigger signal that causes a single photon source (e.g., a quantum dot) within then photon source 116 to emit a single photon at a specified time. Alternatively, the time information may be encoded by using the trigger signal to modulate the intensity of a phase randomized laser source within the photon source 116. By reducing the intensity of a laser source, the photon source 116 ensures that a single photon is produced with a high probability.

The trigger signal may ensure that the photon 420 is generated at a specific time within a time structure defined by a frame that includes the photon 420. In other words, the photon 420 may be preceded, followed, or surrounded by one or more timing signals (e.g., in a header/footer of an optical frame) and the timing information encoded in the photon 420 is based on the relative timing of the photon 420 and the frame timing signal.

Any combination of the time information and frequency information of the photon 420 may be used by the endpoints 110 and 120 to generate the same set of bits for at least a portion of a secret key. Additional photons, either from the entangled pair resource 140 or prepared by the first endpoint 110 and measured by the second endpoint 120, may be used to generate additional sets of bits for a longer secret key. The respective QKD logic in the first endpoint 110 and the second endpoint 120 may perform additional information reconciliation and/or privacy amplification steps to determine a secure key for additional communication between the first endpoint 110 and the second endpoint 120.

In another example, the first endpoint 110 and the second endpoint 120 may measure the noise captured in the measurement of the joint time-frequency state of the photon 420 to determine whether the photon 420 has been intercepted before arriving at the second endpoint 120. Based on the noise in the measurement of the time information and the frequency information, the first endpoint 110 and the second endpoint 120 may quantify the amount of information that may be leaked to an eavesdropper along the optical link 130. The measure of leaked information may be further used for privacy amplification.

Figure 5:
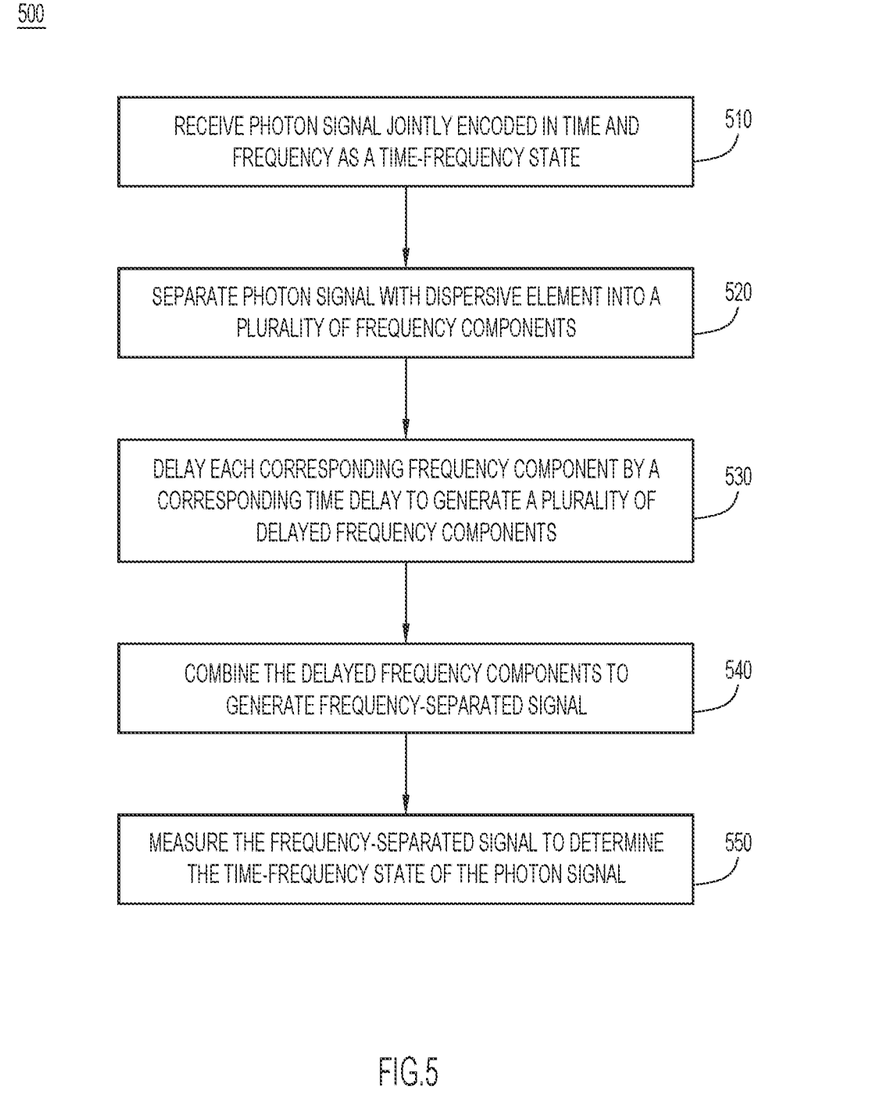
FIG. 5 is a flowchart illustrating operations performed by an endpoint to receive and decode a joint-time-frequency encoded photon, according to an example embodiment.

Referring now to FIG. 5, a flowchart illustrates an example process 500 performed by an endpoint (e.g., endpoint 110 or endpoint 120) to decode time and frequency information from a single photon. At 510, the endpoint receives the photon signal that has been jointly encoded with time information and frequency information as a time-frequency state. In one example, the photon signal may be one half of an entangled photon pair that was sent to the endpoint and a remote endpoint with which the endpoint will communicate. Alternatively, the photon signal may be a photon prepared by a remote endpoint in the joint time-frequency state.

At 520, the endpoint separates the photon signal with a dispersive element into a plurality of frequency components. In one example, the dispersive element may be a transmissive grating or a reflective grating. At 530, the endpoint delays each corresponding frequency component by a corresponding time delay to generate a plurality of delayed frequency components. In one example, the frequency components are delayed by a corresponding delay loop that delays the corresponding frequency component by a corresponding length of time. The corresponding length of time for each frequency component separates the delayed frequency components of the photon signal such that they do not overlap in time.

At 540, the endpoint combines the plurality of delayed frequency components to generate a frequency-separated signal. In one example, the endpoint combines the delayed frequency components with an optical switch. At 550, the endpoint measures the frequency-separated signal to determine the time-frequency state of the photon signal. In one example, the endpoint includes one single photon detector that measures both the time information and the frequency information from the frequency-separated signal. In another example, the endpoint may additionally measure the noise in the measurement of the frequency-separated signal and use the noise measurement to detect a potential eavesdropping attack. The measure of noise may be used to calculate an amount of information that may have been leaked to an eavesdropper.

Figure 6:
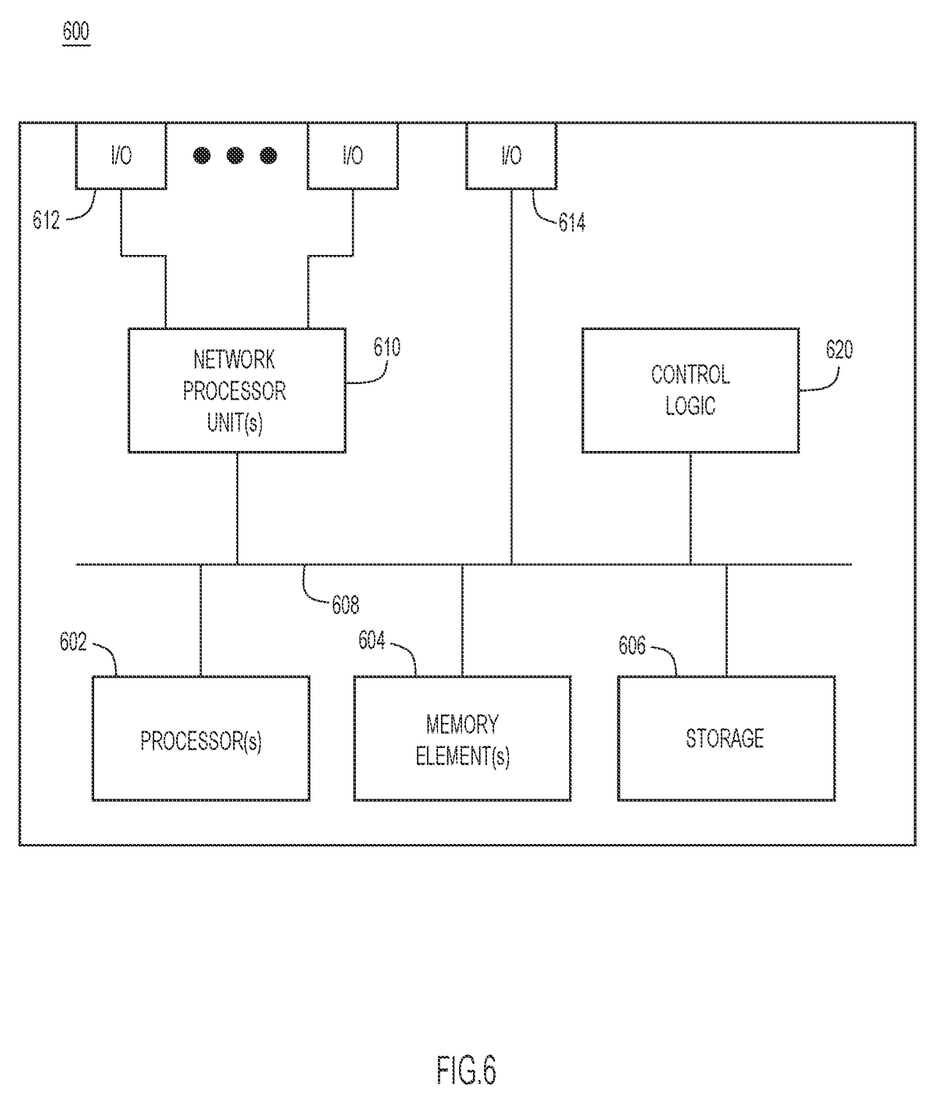
FIG. 6 is a block diagram of a computing device that may be configured to perform the techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1-3, 4A, 4B, and 5. In various embodiments, a computing device, such as computing device 600 or any combination of computing devices 600, may be configured as any entity/entities as discussed for the techniques depicted in connection with FIGS. 1-3, 4A, 4B, and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store quantum data, classical data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a classical network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein enable single photon joint time-frequency measurement for optical communication. The joint time-frequency measurement scheme solves an important security issue in traditional time encoding or frequency encoding QKD protocols, and may be useful for other optical communication and sensing protocols. Additionally, using only one single photon detector to detect both the time information and the frequency information conserves resources for constructing and maintaining each endpoint.

In some aspects, the techniques described herein relate to a method including: receiving a photon signal jointly encoded in time and frequency as a time-frequency state; separating the photon signal with a dispersive element to generate a plurality of frequency components; delaying each corresponding frequency component of the plurality of frequency components by a corresponding time delay to generate a plurality of delayed frequency components; combining the plurality of delayed frequency components to generate a frequency-separated signal; and measuring the frequency-separated signal to determine the time-frequency state of the photon signal.

In some aspects, the techniques described herein relate to a method, wherein the dispersive element includes a grating.

In some aspects, the techniques described herein relate to a method, wherein delaying each frequency component includes directing each frequency component to a corresponding delay loop with a length that is a corresponding integer multiple of a base length.

In some aspects, the techniques described herein relate to a method, wherein the base length is long enough to contain the photon signal.

In some aspects, the techniques described herein relate to a method, further including: determining an amount of noise in a measurement of the time-frequency state of the photon signal; and detecting an eavesdropping attack on the photon signal based on the amount of noise.

In some aspects, the techniques described herein relate to a method, further including generating at least a portion of a secret key based on the time-frequency state of the photon signal.

In some aspects, the techniques described herein relate to a method, wherein the plurality of delayed frequency components are combined using an optical switch.

In some aspects, the techniques described herein relate to a method, wherein the frequency-separated signal is measured with a single photon detector.

In some aspects, the techniques described herein relate to an apparatus including: an optical input configured to receive a photon signal jointly encoded in time and frequency as a time-frequency state; a dispersive element configured to separate the photon signal into a plurality of frequency components; one or more delay loops configured to generate a plurality of delayed frequency components, wherein each delay loop corresponds to one frequency component of the plurality of frequency components and is configured to delay a corresponding frequency component of the plurality of frequency components by a corresponding time delay; a combiner configured to combine the plurality of delayed frequency components to generate a frequency-separated signal; and a detector configured to measure the frequency-separated signal and determine the time-frequency state of the photon signal.

In some aspects, the techniques described herein relate to an apparatus, wherein the dispersive element includes a grating.

In some aspects, the techniques described herein relate to an apparatus, wherein delaying each frequency component includes directing each frequency component to a corresponding delay loop with a length that is a corresponding integer multiple of a base length.

In some aspects, the techniques described herein relate to an apparatus, wherein the base length is long enough to contain the photon signal.

In some aspects, the techniques described herein relate to an apparatus, further including an eavesdropping detection module configured to: determine an amount of noise in a measurement of the time-frequency state of the photon signal; and detect an eavesdropping attack on the photon signal based on the amount of noise.

In some aspects, the techniques described herein relate to an apparatus, further including a Quantum Key Distribution (QKD) module configured to generate at least a portion of a secret key based on the time-frequency state of the photon signal.

In some aspects, the techniques described herein relate to an apparatus, wherein the combiner includes an optical switch.

In some aspects, the techniques described herein relate to a system including: a measurement module configured to: receive a photon signal jointly encoded in time and frequency as a time-frequency state; separate the photon signal to generate a plurality of frequency components; delay each corresponding frequency component of the plurality of frequency components by a corresponding time delay to generate a plurality of delayed frequency components; combine the plurality of delayed frequency components to generate a frequency-separated signal; and measure the frequency-separated signal to determine the time-frequency state of the photon signal; and a Quantum Key Distribution (QKD) module configured to generate at least a portion of a secret key based on the time-frequency state of the photon signal.

In some aspects, the techniques described herein relate to a system, wherein the measurement module includes a dispersive element to separate the photon signal into the plurality of frequency components.

In some aspects, the techniques described herein relate to a system, wherein the dispersive element includes a grating.

In some aspects, the techniques described herein relate to a system, wherein the measurement module includes an optical switch to combine the plurality of delayed frequency components.

In some aspects, the techniques described herein relate to a system, further including an eavesdropping detection module configured to: determine an amount of noise in a measurement of the time-frequency state of the photon signal; and detect an eavesdropping attack on the photon signal based on the amount of noise.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving a photon signal jointly encoded in time and frequency as a time-frequency state;
   separating the photon signal with a dispersive element to generate a plurality of frequency components;
   delaying each corresponding frequency component of the plurality of frequency components by a corresponding time delay to generate a plurality of delayed frequency components;
   combining the plurality of delayed frequency components to generate a frequency-separated signal; and
   measuring the frequency-separated signal to determine the time-frequency state of the photon signal.

2. The method of claim 1, wherein the dispersive element comprises a grating.

3. The method of claim 1, wherein delaying each frequency component comprises directing each frequency component to a corresponding delay loop with a length that is a corresponding integer multiple of a base length.

4. The method of claim 3, wherein the base length is long enough to contain the photon signal.

5. The method of claim 1, further comprising:
   determining an amount of noise in a measurement of the time-frequency state of the photon signal; and
   detecting an eavesdropping attack on the photon signal based on the amount of noise.

6. The method of claim 1, further comprising generating at least a portion of a secret key based on the time-frequency state of the photon signal.

7. The method of claim 1, wherein the plurality of delayed frequency components are combined using an optical switch.

8. The method of claim 1, wherein the frequency-separated signal is measured with a single photon detector.

9. An apparatus comprising:
an optical input configured to receive a photon signal jointly encoded in time and frequency as a time-frequency state;
a dispersive element configured to separate the photon signal into a plurality of frequency components;
one or more delay loops configured to generate a plurality of delayed frequency components, wherein each delay loop corresponds to one frequency component of the plurality of frequency components and is configured to delay a corresponding frequency component of the plurality of frequency components by a corresponding time delay;
a combiner configured to combine the plurality of delayed frequency components to generate a frequency-separated signal; and
a detector configured to measure the frequency-separated signal and determine the time-frequency state of the photon signal.

10. The apparatus of claim 9, wherein the dispersive element comprises a grating.

11. The apparatus of claim 9, wherein delaying each frequency component comprises directing each frequency component to a corresponding delay loop with a length that is a corresponding integer multiple of a base length.

12. The apparatus of claim 11, wherein the base length is long enough to contain the photon signal.

13. The apparatus of claim 9, further comprising an eavesdropping detection module configured to:
determine an amount of noise in a measurement of the time-frequency state of the photon signal; and
detect an eavesdropping attack on the photon signal based on the amount of noise.

14. The apparatus of claim 9, further comprising a Quantum Key Distribution (QKD) module configured to generate at least a portion of a secret key based on the time-frequency state of the photon signal.

15. The apparatus of claim 9, wherein the combiner includes an optical switch.

16. A system comprising:
a measurement module configured to:
receive a photon signal jointly encoded in time and frequency as a time-frequency state;
separate the photon signal to generate a plurality of frequency components;
delay each corresponding frequency component of the plurality of frequency components by a corresponding time delay to generate a plurality of delayed frequency components;
combine the plurality of delayed frequency components to generate a frequency-separated signal; and
measure the frequency-separated signal to determine the time-frequency state of the photon signal; and
a Quantum Key Distribution (QKD) module configured to generate at least a portion of a secret key based on the time-frequency state of the photon signal.

17. The system of claim 16, wherein the measurement module includes a dispersive element to separate the photon signal into the plurality of frequency components.

18. The system of claim 17, wherein the dispersive element comprises a grating.

19. The system of claim 16, wherein the measurement module includes an optical switch to combine the plurality of delayed frequency components.

20. The system of claim 16, further comprising an eavesdropping detection module configured to:
determine an amount of noise in a measurement of the time-frequency state of the photon signal; and
detect an eavesdropping attack on the photon signal based on the amount of noise.

* * * * *